Figure 1:
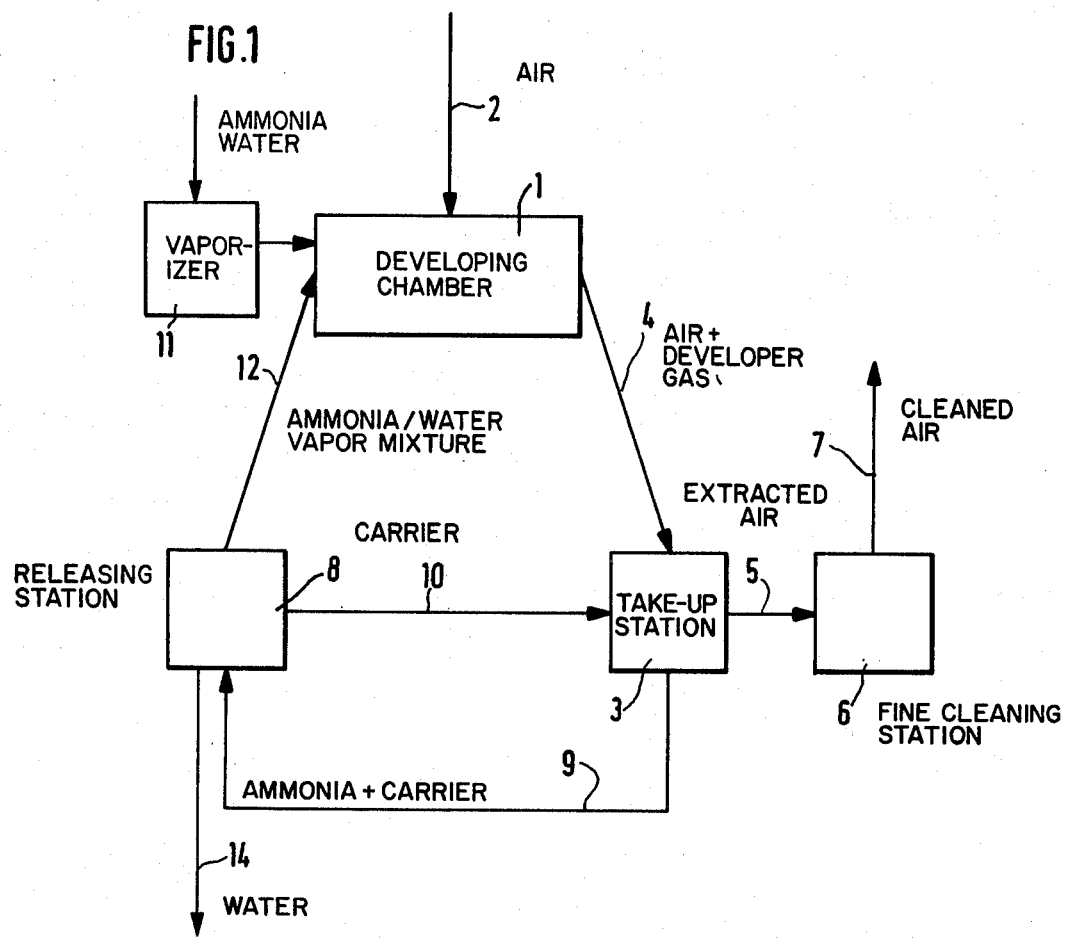

United States Patent [19]

Degenhardt et al.

[11] 4,212,655
[45] Jul. 15, 1980

[54] ARRANGEMENT FOR AMMONIA FEED IN COPYING EQUIPMENT

[75] Inventors: Karl-Heinz Degenhardt, Bad Schwalbach; Gerhard Marx, Taunusstein; Hermann Frank, Niederwalluf, all of Fed. Rep. of Germany

[73] Assignee: Hoechst Aktiengesellschaft, Frankfurt, Fed. Rep. of Germany

[21] Appl. No.: 846,311

[22] Filed: Oct. 28, 1977

[30] Foreign Application Priority Data

Oct. 29, 1976 [DE] Fed. Rep. of Germany ....... 2649294

[51] Int. Cl.$^2$ .............................................. B01D 53/06
[52] U.S. Cl. ........................................ 55/181; 55/208; 55/390; 354/300
[58] Field of Search .......................... 55/70, 75, 77–79, 55/89, 161, 179, 181, 208, 387, 389, 390; 354/300

[56] References Cited

U.S. PATENT DOCUMENTS

| | | | |
|---|---|---|---|
| 1,892,428 | 12/1932 | Fonda | 55/161 X |
| 2,083,732 | 6/1937 | Moore et al. | 55/179 X |
| 2,507,607 | 5/1950 | Miller | 55/179 |
| 3,197,944 | 8/1965 | Westeren et al. | 55/179 X |
| 3,257,773 | 6/1966 | Connors et al. | 55/179 X |
| 3,421,984 | 1/1969 | Jensen et al. | 55/179 X |
| 3,487,608 | 1/1970 | Graff | 55/179 X |
| 3,686,832 | 8/1972 | Hori et al. | 55/179 |
| 3,757,492 | 9/1973 | Graff | 55/181 |
| 3,808,773 | 5/1974 | Reyhing et al. | 55/70 X |
| 4,047,904 | 9/1977 | Worrall | 55/179 X |

FOREIGN PATENT DOCUMENTS

453470 12/1948 Canada ..................................... 55/179

OTHER PUBLICATIONS

Linde Molecular Sieves, Form 9691–D, "Non–Hydrocarbon Materials Data Sheets," 4/3/1958.
Brooking et al., "The Specification of Molecular Sieve Adsorption Systems," *The Chemical Engineer*, 1/1972, pp. 13–18.

*Primary Examiner*—Robert H. Spitzer
*Attorney, Agent, or Firm*—James E. Bryan

[57] ABSTRACT

This invention relates to an improvement in an arrangement for ammonia feed in copying equipment with several switchable adsorption vessels, for instance four or five vessels, containing an adsorbent, at least one adsorption vessel of which in each case, the adsorbent of which is not saturated with ammonia, is charged with ammonia-containing air extracted from a developing chamber before this air leaves the copying equipment as cleaned exhaust air, and at least one adsorption vessel of which after saturation of the adsorbent can be regenerated by heating, and means whereby the liberated ammonia can be fed to the developing chamber.

Each adsorption vessel can be connected via respective means to a line for the air extracted from pre-chambers of the developing chamber. The respective means are actuated according to a step-by-step switch unit. Furthermore, each adsorption vessel includes a gas outlet which can be either connected to the developing chamber or to an exhaust air line.

The step-by-step switch unit receives a control signal from a measuring instrument which measures the concentration of the ammonia in the exhaust air. Measuring probes determine the concentration of ammonia, respectively of water vapor, in the developing chamber and are connected to a control instrument which serves to actuate the electrical heating of the adsorption vessels.

9 Claims, 6 Drawing Figures

ARRANGEMENT FOR AMMONIA FEED IN COPYING EQUIPMENT

The present invention relates to an arrangement for ammonia feed in copying equipment.

A process is already known for ammonia feed in copying equipment, according to which the ammonia-containing extracted air, coming from a developer part, is fed to a take-up station for the removal of the ammonia from the extracted air, and in which the ammonia taken up in the take-up station is liberated in a release station and is fed again to the developer part (German Offenlegungsschrift No. 2,337,961).

The extracted air which is to a large extent freed from ammonia then can be discharged as exhaust air into the environment without hesitation. In this connection it is further known that the ammonia-containing extracted air in the take-up station is fed through a carrier for the ammonia and that the carrier charged with ammonia is fed continuously or discontinuously to the release station. The carrier, which is regenerated in the release station, again can be fed, continuously or discontinuously, to the take-up station. The use of an adsorbent, in particular a molecular sieve, as a carrier, is also known. The take-up station is composed, in this case, of one or more adsorption vessels which are filled with the adsorbent through which the extracted air is fed for the adsorption of the ammonia. Molecular sieves which have been mentioned are, for example, metal aluminum silicates, especially sodium aluminum silicates of the type 3A and 4A (pore size 3 and 4 Å). Because conventional sieves take up water relatively more readily than ammonia, so that the pores can become occupied by water molecules, it is already known in the art to provide an adsorption vessel, filled with another substance, upstream of the molecular sieve in the take-up station, in order to remove the greater part of the water from the exhaust air before it flows through the molecular sieve in the take-up station. The molecular sieve, which is saturated with ammonia in the receiving station, is heated for regeneration, i.e., for liberating, the ammonia in the release station, and the liberated ammonia is fed to the developer part. Likewise, the water can be released again in the release station. Fresh ammonia and water can be fed to the circulation to compensate for the losses of developer gas. Feeding the carrier which is freed from ammonia, for renewed use in the take-up station is of particular significance in the case of the relatively expensive molecular sieves.

In the case of the process known from the above and the conceivable arrangements for carrying out the process, there is the problem of providing for a continuous ammonia take-up in the adsorption vessels with the lowest possible expenditure, in spite of the batchwise processes of ammonia take-up and ammonia release. There is moreover the problem of not feeding the entire amount of water contained in the exhaust air, which water is readily taken up by conventional molecular sieves, to the developer part again.

The object on which the present invention is based is to solve the two above-mentioned problems: the ammonia should be continuously removed from the extracted air and the water, taken up in the process by the adsorption vessels, should be released and fed to the developing part in such a manner that the concentration of the gas components assumes and maintains the most favorable values for the development.

The device, which works according to the adsorption process, for removing the ammonia from the exhaust air, and recovering the ammonia for the developing, requires no liquid carrier. The difficulties that can arise when working with liquids, such as liquid losses from leakages, are avoided from the start. In addition it has proved possible with the present arrangement to operate with only four adsorption vessels and nevertheless to remove the ammonia from the exhaust air continuously with good effect. In a particularly advantageous manner it is possible, however, to dispense here with additional adsorbents which have the purpose only of keeping water away from the adsorption vessel provided to take up the ammonia from the extracted air, in order to counter the phenomenon that conventional micro-filters preferentially take up water from the extracted air in addition to ammonia. Nevertheless, by means of the measures taken here, it is possible to feed back to the developing chamber or the developer part virtually all the ammonia from the extracted air.

In a particularly appropriate embodiment of the invention, water that has been previously adsorbed from the extracted air also can be fed to the developing chamber. For this purpose the total arrangement is extended to five switchable adsorption vessels. With this arrangement it is possible to feed the desired water proportion to the developing chamber, because an individually determinable part of the water instead of being fed into the developing chamber can be fed into the exhaust air where, unlike the ammonia, it does not pollute.

The ammonia and water concentrations prevailing in the developing chamber are regulated automatically. With a preferred arrangement switching-over takes place only by the adsorption vessels and the common axle of the arrangement being switched further by one step, when the ammonia concentration in the exhaust air exceeds a predetermined amount. A further reason why this arrangement is not very expensive and not very susceptible to breakdowns is that here a multipart arrangement of flaps and valves is dispensed with, because the control of the inlets and outlets of the adsorption vessels, as also the heating and cooling, is effected automatically by the combined rotation of the arrangement of all adsorption vessels so that they are connected at every point in time to the correct feed and discharge lines, as well as to the heat energy source and the cooling air stream.

Figure 2:
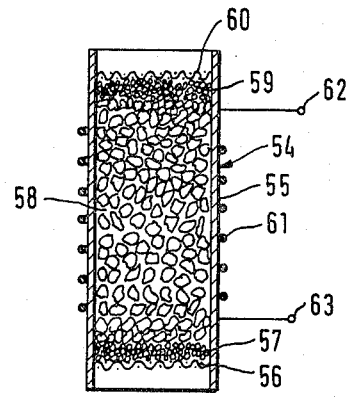
Figure 4:
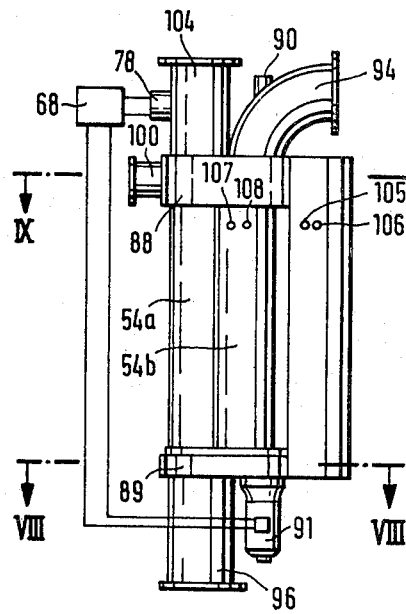
Figure 6:
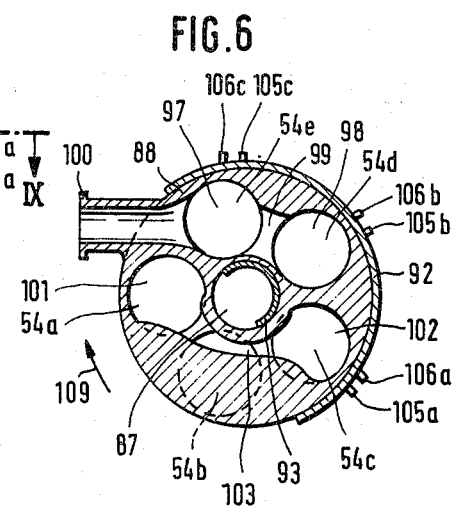
Figure 5:
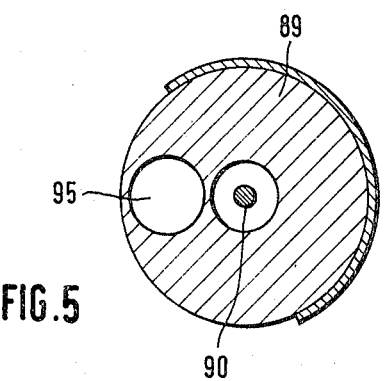
Figure 3:
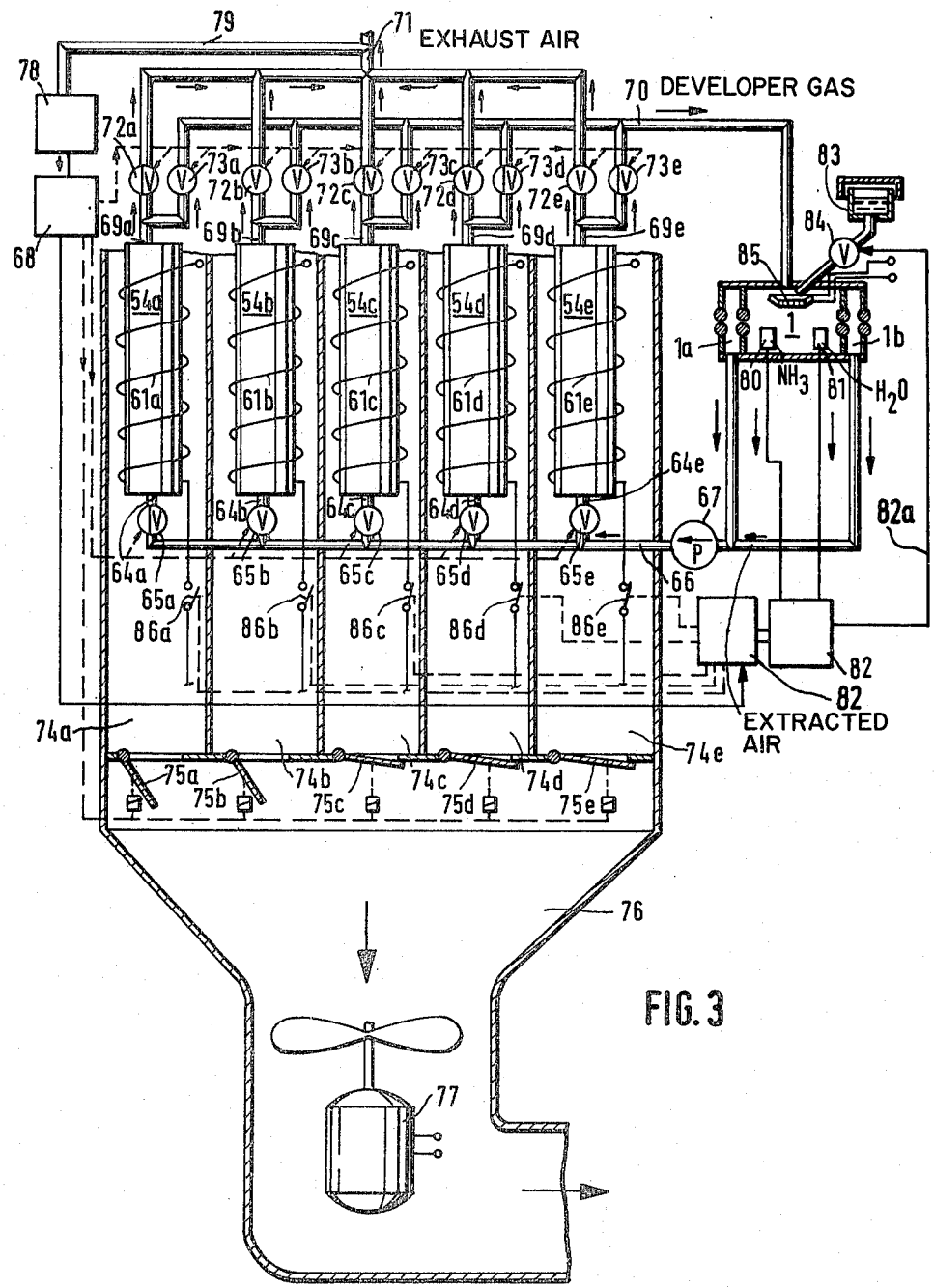

The invention will be further illustrated by reference to the accompanying drawings, in which:

FIG. 1 shows a schematic representation of the circulation of ammonia and adsorbent;

FIG. 2 shows a longitudinal section through an adsorption vessel for taking up ammonia and water from the ammonia-containing air extracted from the developing chamber, FIG. 3 shows an arrangement with five adsorption vessels for separating ammonia and water from the air extracted from a developing chamber and for recycling them to the developing chamber, FIG. 4 shows a side view of another arrangement in which five adsorption vessles are connected together as a rotatable unit, FIG. 5 shows a cross-section along the line VIII/VIII of FIG. 4 and FIG. 6 shows a cross-section along the line IX/IX of FIG. 4.

In FIG. 1 the developing gas, composed of air, water and ammonia, is extracted from the developing chamber 1 in order to prevent leakage of the developing gas through the input and output openings for the diazotype material to be developed. In this process air is also drawn in from outside through these openings (arrow 2). The developing gas extracted from the developing chamber 1 is fed to the take-up station 3 (arrow 4) which is an adsorption vessel. The exhaust air (arrow 5) leaving the take-up station 3 can be fed to a further fine-cleaning station 6 to remove further slight amounts of ammonia from the exhaust air. This cleaned exhaust air leaves the fine-cleaning station 6 in the direction of the arrow 7. For this purpose the fine-cleaning station contains, for example, citric acid which is not fed back to the circulation. In addition to ammonia the adsorption vessel advantageously can take up water from the air extracted from the developing chamber.

The ammonia adsorbed in the take-up station, together with the adsorbent and, if appropriate, with the water taken up, is transferred (arrow 9) into the release station 8 and there liberated again by heating. The carrier remains behind in the release station and can be fed back (arrow 10) again into the take-up station 3. The ammonia-water vapor mixture liberated by heating in the release station 8 can be fed back (arrow 12) into the developing chamber 2.

In order to compensate for the losses of developing gas in the developing chamber 1, additional aqueous ammonia solution can be fed to a vaporizer 11 which is connected to the developing chamber 1. Surplus water can be withdrawn (arrow 14) from the circulation. Two detailed embodiments of this construction according to FIG. 1 are described below with the aid of FIGS. 2 to 5:

A single adsorption vessel 54 is represented in FIG. 2. It is composed of a shell 55 in which an inert granular layer 57 is supported on a sieve tray 56 with the adsorbent 58 located above the inert granular layer.

The adsorbent can have various shapes, for example there are spheres of about 5 mm diameter, small rods of 3 mm diameter and 8 mm length, or powder, the grains of which have a diameter predominately between 20 and 50 $\mu$m, and shaped bodies. They are composed preferably of aluminum oxide ($Al_2O_3$).

A particularly good take-up of water and ammonia is possible with molecular sieves, containing adsorbent, which advantageously have a pore size of 4 Å. These molecular sieves can adsorb up to 20 percent by weight of water. The molecular sieves, as with other shaped adsorbents, can be used several times; they merely must be regenerated and activated between two adsorption operations. This is carried out by heating them to about 500° C. and subsequently cooling them again, a cooling to room temperature being sufficient. The molecular sieve 13 X of Messrs. Mobilbit can be used. Further suppliers of molecular sieves are: Union Carbide Deutschland, Düsseldorf; Bayer, Leverkusen; and Grace, Bad Homburg. Additional general information on molecular sieves is contained in the book by Gruber, Jero and Ralek "Molekularsiebe (Molecular Sieves)," Verlag der Wissenschaften.

It can be further seen from FIG. 2 that the top of the adsorbent is also covered by an inert granular layer 59 below a second sieve tray 60.

To heat the adsorbent the shell 55 is surrounded by an electric heater 61 with the terminals 62 and 63.

FIG. 3 shows how an arrangement of five adsorption vessels, according to FIG. 2, is, in a first embodiment, connected up operationally to a developing chamber 1 with pre-chambers 1a and 1b. In this process the five adsorption vessels are operated alternately as take-up stations and as release stations, as will be further described below. During operation as a take-up station the adsorption vessel which is maintained at a low temperature, in particular room temperature, acts as an adsorber; during operation as a release station the adsorption vessel is heated and the adsorbent is regenerated.

For the description of the purpose of the adsorption vessels, which will be described in more detail in connection with FIG. 3, the initial assumption is made that the named conventional molecular sieves first adsorb water and then ammonia, and on driving-out or regeneration first the ammonia and then the water is released.

In FIG. 3 gas connections 64a, b, c, d, e, in the vicinity of the base of the adsorption vessels, are each connected via a valve 65a, b, c, d, e, respectively, to a line 66 for the air extracted from the prechambers 1a, 1b. The pump 67 serves to extract the air loaded with ammonia from the pre-chambers 1a, 1b. The valves 65a–65e can be actuated according to a step-by-step switch unit 68, as indicated by a broken line.

Each adsorption vessel possesses further, on its upper part, a gas outlet 69a, b, c, d, or e, which can be either connected to the developing chamber 1 via a line 70, or connected to the exhaust air via a line 71. Two parallel valves 72a and 73a, 72b and 73b, 72c and 73c, 72d and 73d, 72e and 73e, respectively, serve for this purpose at the gas outlet of each adsorption vessel. The valves are again actuated according to the step-by-step switch unit 68 which also here is indicated by a broken line.

Each adsorption vessel is located in a flow duct 74a, b, c, d or e which can be closed by a flap 75a, b, c, d or e. The flow ducts 74a–e end in a duct 76 in which a fan 77 is located which can serve at the same time for cooling the copying device. The flaps 75a –e are likewise actuated according to the step-by-step switch unit 68.

The step-by-step switch unit 68 receives a control signal from a measuring instrument 78 which measures the concentration of the ammonia in the exhaust air. For this purpose the measuring instrument, which advantageously operates according to the principle of infrared adsorption, is connected to the line 71 for the exhaust air via a measuring line 79.

A measuring probe 80 for the concentration of ammonia in the developing chamber and a measuring probe 81 for the concentration of water vapor in the developing chamber are provided in the developing chamber 1. Both measuring probes are connected to a control instrument 82. This serves, via a distributor 82d connected to its output, to actuate switches 86a–e which are each connected to the electric heaters 61a, b, c, d, or e, respectively, of each adsorption vessel. The distributor is furthermore connected to the step-by-step switch unit 68 to cause the switches 86a–e to be opened and closed by the control instrument depending upon the switching position of the step-by-step switch unit or, during this switching position of the step-by-step switch unit, to remain opened or closed permanently.

The developing station operates, in the present case, according to the principle of complete vaporization in which the aqueous solution of ammonia is fed from the storage vessel 83 via the valve 84 directly to a vaporizer 85 in the developing chamber and is heated to a sufficiently high temperature that no condensation occurs in the developing chamber 1.

For the description of the purpose of the arrangement according to FIG. 3 it will be assumed that the developing chamber 1 is in operation and is filled with the ammonia-water mixture required for developing. It will be further assumed that the adsorption vessel 54a is switched through to the line 66 for taking up the air extracted from the pre-chambers 1a, 1b, as indicated by a solid stroke in the symbol for the valve. In this phase the adsorption vessel 54a should be effective for adsorbing ammonia from the extracted air, water being adsorbed at the same time. For this purpose the adsorption vessel 54a is subjected to the cooling air stream of the fan 77 and maintained at room temperature. The flap 75a is open. The air, which is to a large extent freed from ammonia and has come from the adsorption vessel 54a, flows via the open valve 72a to the exhaust-air line 71. During this process the concentration of ammonia in the exhaust air is measured, via the sampling line 79 by means of the measuring instrument 78. The switching unit 68 maintains the switching position represented in FIG. 3 as long as the concentration of ammonia does not exceed a predetermined value. When the predetermined limiting value is reached this is a sign that the adsorption vessel is saturated and a switchover to another vessel, the adsorbent of which is still fresh, must be effected.

Whereas the adsorption vessel 54a serves, in the indicated operating phase, for adsorption, the adsorption vessels 54d, 54e deliver, in this operating phase, ammonia and water vapor as constituents of the developer gas that is fed into the line 70. For this purpose the valves 73d, 73e are switched open. In this operating phase the switching position of the switches 86d, 86e depends upon what concentrations of ammonia and water vapor are measured by the measuring probes 80, 81 in the developing chamber. In this case the ammonia is driven out, in a first discharging step, from the material accumulated in the adsorption vessel 54e. During a second step predominantly water is driven out from the adsorbent of the adsorption vessel 54d. The composition of the developer gas fed to the developing chamber 1 depends then, in the position of the valves 72, 73 represented in FIG. 3, on how long the switch 86e for the adsorption vessel discharging predominantly ammonia, and the switch 86d for the adsorption vessel deliverying predominantly water, is closed.

Insofar as the desired concentrations of materials cannot be achieved or maintained in the developing chamber by the driving out of the material contained in the adsorption vessels, fresh developer solution is fed, via the metering valve 84, into the developing chamber, where the developer solution vaporizes. For this purpose the metering valve is controlled by the control instrument 82 via a line 82a.

In a third driving-out step one of the adsorption vessels is regenerated and activated by complete removal of all the adsorbed materials. For this purpose the adsorption vessel 54c, in FIG. 3, is connected to the exhaust-air line 71 and the switch 86c is permanently closed until, by continuous heating, the residual water is removed from the adsorbent.

With proper dimensioning of the arrangement the ammonia is reliably driven out from each adsorption vessel before it is connected to the exhaust line 71.

Before the next adsorption the adsorbent, which is freed from the adsorbed materials, must be prepared for renewed material take-up, and this is effected by cooling this adsorbent. For this purpose, in a last step, the heating of the adsorption vessel 54b is switched off by means of the switch 86b and the flap 75b is opened so that the cooling air, transported by the fan 77, can flow unhindered past the adsorption vessel 54b. Following this the adsorption vessel 54b can again be used as a take-up station.

The ammonia losses which occur in the circulation from the developing chamber 1 via the pre-chambers 1a, 1b, the line 66, the adsorption vessels 54 and the line 70, and the ammonia losses which are caused by the copying material transported out of the developing chamber, are compensated for by direct vaporization of the aqueous ammonia solution metered in via the metering valve 84.

In FIG. 3 the adsorption vessel 54a represents the take-up station, while the adsorption vessels 54d, e form the release station in the operating phase. The adsorption vessels 54b, c are not connected to the developing chamber. They can be considered as containers of the carrier which is being transported from the release station to the take-up station. Upon the further switching of the adsorption vessels in each case when the concentration of ammonia increases in the exhaust air line 71 the valves are switched in such a manner that there is always one adsorption vessel serving as a take-up station and two adsorption vessels acting as a release station, while the last two adsorption vessels are connected neither to the line 66 for the extracted air nor to the line 70 for the developer gas so that they can be completely regenerated and activated.

In FIGS. 4, 5 and 6 a particularly appropriate construction of five adsorption vessels, with the accompanying elements, is represented as the second embodiment.

The five adsorption vessels 54a–e are arranged in a circle around an inner duct 87 with the same distance between one another and joined rigidly to each other. The adsorption vessels are in this case arranged so that clear interspaces remain between them. The adsorption vessels have openings above and below which can be closed by control discs 88 and 89 as will be explained below.

The five adsorption vessels can be rotated as a unit about an axle 90 which projects from the control discs 88, 89. A motor 91 for driving the adsorption units is flange-mounted on the lower control disc 89.

On the outside of the control discs a part of the imaginary shell lying between them is covered by a guide shell 92. An inner guide shell 93 in the inner duct 87 corresponds to the outer guide shell. The outer and the inner guide shells are dimensioned so that, viewed from above, they cover the same sector of the cross-sectional area of the adsorption vessels, i.e., in any position they cover three adsorption vessels, which in FIG. 6 are the adsorption vessels 54c, 54d, 54e. The inner duct 87 is connected to a cooling air connecting branch 94.

The lower control disc 89, which is represented in FIG. 5, has a single circular opening 95 over which a lower opening of one of the adsorption vessels can be rotated. The opening 95 leads into a branch 96 which can be connected to a line for the air extracted from the pre-chambers.

In the upper control disc, which is represented in FIG. 6, two openings 97, 98 can be seen which are offset by the distance between two adjacent adsorption vessels. These openings 97, 98 are connected to each other by a connecting duct 99 and are led to a connecting branch 100 to which a line for feeding the developer gas into the developing chamber can be connected. The upper control disc has moreover two openings 101, 102 which lie apart at the distance between two adsorption vessels separated by a third adsorption vessel and are connected to each other by a second connecting duct 103. They are connected to a vertically arranged branch 104 for connection to a line for the exhaust air. The measuring instrument 78 is here let into the branch for the measurement of the concentration of ammonia and is connected electrically to the step-by-step switch unit 68. The step-by-step switch unit is connected to the motor 91.

In the unit constructed according to FIGS. 4 to 6 the valves and flaps represented in FIG. 3 are thus replaced by two control discs. All control functions are in this case carried out by rotating the group of adsorption vessels. This control system is particularly simple and reliable. Only an addition with regard to the electric heating of the adsorption vessels is required and this corresponds to the embodiment according to FIG. 2. For the connection of the electric heating to each of three adsorption vessels—more than three adsorption vessels never need to be heated at the same time—pairs of electrical contacts 105a, 106a and 105b, 106b and 105c, 106c, respectively, are embedded in the outer guide shell, the pairs being offset from one another by the separation of the adsorption vessels. Each adsorption vessel is provided with a corresponding pair of contacts which can be brought into contact with the contacts on the outer shell when such a pair of contacts is rotated to the contacts in the outer shell. In FIG. 4 a pair of contacts 107, 108 can be seen on the adsorption vessel 54b. The contacts 105c, 106c, and 105b, 106b are connected to a control instrument which is constructed similarly to the control instrument 82, while the contacts 105a, 106a are permanently connected to a current source. The measuring branch for the concentration of ammonia in the developing chamber is in this case allocated to the contacts 105c, 106c, and the measuring branch for the concentration of water vapor in the developing chamber to the contacts 105b, 106b (measuring probes 80 and 81 in FIG. 3).

The unit constructed according to FIGS. 4 to 6, insofar as its function differs from that which was described in connection with FIG. 3, is operated as follows:

In the position of the adsorption vessels, with respect to the control discs, shown in FIGS. 4 to 6, in particular FIG. 6, the ammonia-containing air extracted from the pre-chambers flows through the adsorption vessel 54a. The adsorption vessel 54a, as likewise the adsorption vessel 54b, is in the cooling air stream, because air is continuously extracted from the branch 94. As a result ammonia is absorbed from the ammonia-air mixture which flows through the adsorption vessel 54a. The exhaust air which is to a large extent freed from ammonia flows away through the exhaust air branch 104. The adsorption vessel 54e, which is next in the clockwise direction, is on the other hand shielded to a large extent from the cooling air stream by the inner guide shell 93 and the outer guide shell 92. In addition the adsorption vessel 54e is heated, according to the control instrument which responds to the concentration of ammonia in the developing chamber, and accordingly ammonia gas is liberated from the adsorbent in the interior of the adsorption vessel in the first driving-out phase. The ammonia gas can flow out through the branch 100 and pass to the developing chamber. In a similar manner the adsorption vessel 54d is connected to the branch 100 via the connecting duct 99 so that the material also driven out from the adsorption vessel 54d flows into the developing chamber. In a second driving-out step, essentially water vapor is liberated from the adsorption vessel 54d. This is effected according to the control instrument which is fed with the actual value of the concentration of water vapor in the developing chamber. The next adsorption vessel 54c, in the clockwise direction, like the adsorption vessel 54d, is not subjected to the cooling air stream, and is heated continuously so that the residual water which has remained on the adsorbent after the second driving-out step, is also driven out. The water vapor thereby produced flows likewise through the second connecting duct 103 to the exhaust air branch 104.

When the capacity of the adsorbent in the adsorption vessel 54a is spent, the concentration of ammonia in the exhaust air, measured in the branch 104, increases significantly. The corresponding measurement result from the measuring instrument 78 causes the step-by-step switch unit 68, by means of the electric motor 91, to rotate the group of adsorption vessels further by one separating distance of the adsorption vessels, in the clockwise direction in FIG. 6, so that now the adsorption vessel 54a takes up the position of the adsorption vessel 54e which in its turn takes up the position of the adsorption vessel 54d, and so on. Hence, in principle the adsorption vessels 54a–e are operated in the same way as the same adsorption vessels arranged stationarily in FIG. 3.

It will be obvious to those skilled in the art that many modifications may be made within the scope of the present invention without departing from the spirit thereof, and the invention includes all such modifications.

What is claimed is:

1. In an arrangement for ammonia feed in copying equipment with at least four switchable adsorption vessels each containing an adsorbent, at least one adsorption vessel of which in each case, the adsorbent of which is not saturated with ammonia, is charged with ammonia-containing air extracted from a developing chamber before this air leaves the copying equipment as cleaned exhaust air, and at least one adsorption vessel of which after saturation of the adsorbent can be regenerated by heating, and means whereby the liberated ammonia can be fed to the developing chamber, the improvement comprising means to connect the adsorption vessels to a line for the ammonia-containing air extracted from the developing chamber, means to heat the individual adsorption vessels, means to connect a gas outlet of each adsorption vessel to an exhaust line and to a line to the developing chamber, means whereby a first adsorption vessel of which in each case can be charged with the air extracted from the developing chamber, means whereby a second adsorption vessel of which in each case can be heated to liberate ammonia and means whereby it can be connected to the developing chamber, means whereby a third adsorption vessel of which in each case likewise can be heated to liberate water and means whereby it can be connected to an exhaust air line, means whereby a fourth adsorption vessel of which in each case, before a renewed charging, with the air discharged from the copying equipment, can be cooled in a cooling air stream, and means whereby the four adsorption vessels can be switched at the same time cyclically, according to the concentration of ammonia measured in the exhaust air, in such a manner that when a predetermined concentration of ammonia is exceeded the fourth adsorption vessel, which has cooled last, can be charged with the air extracted from the developing chamber, that the third adsorption vessel, heated last to liberate water, can be cooled, and the second adsorption vessel, heated last to drive out the ammonia, continues to be heatable but can be connected to the exhaust air line instead of the developing chamber, and the first adsorption vessel charged last with extracted air can be heated to drive out the ammonia and can be connected to the developing chamber, and wherein each adsorption vessel is located in a separate flow duct of a coolant, including means whereby each flow duct can be closed and can be connected to a common duct for the coolant, and including means in said common duct for circulating ambient air as said coolant.

2. An arrangement according to claim 1 including means connecting each adsorption vessel on the inlet side, via a valve, to an extraction device to extract the air from pre-chambers of the developing chamber.

3. An arrangement according to claim 2 including means connecting the exhaust air line to a measuring instrument to measure the concentration of ammonia in the exhaust air, means connecting said measurement instrument to said means for switching the adsorption vessels at the same time cyclically, said means being a step-by-step switch unit, which actuates valves connected to the gas outlets of each adsorption vessel, said valves connecting either the gas outlets to the developing chamber via a line or to the exhaust air via another line.

4. An arrangement according to claim 1 including means to separately switch on said means to heat each adsorption vessel, one probe each for measuring the concentrations of ammonia and water, respectively, extending into the developing chamber, said measuring probes being connected to the input side of a control instrument which is connected on its output side, via a distributor controlled by the switching means, to switches of the heaters, in such a manner that the heater, in each of those adsorption vessels which are connected to the outlet side of the developing chamber, can be switched on by the control instrument.

5. An arrangement according to claim 1 in which the adsorption vessels are constructed as cylindrical containers open at the top and bottom, they are arranged in a circle around an inner duct with open interspaces between them left clear, means rigidly connecting them to one another and means whereby they can be rotated around a common axle, a stationary control disc opposite both the top and bottom of the adsorption vessels, which is common to all adsorption vessels, whereby the openings of the adsorption vessels can be closed, one branch for connecting at least one adsorption vessel to the developing chamber, and one branch for connecting at least one adsorption vessel to the exhaust air line, leading to one control disc, and one branch for connecting each adsorption vessel to a line for the air extracted from the developing chamber leading to the other control disc.

6. An arrangement according to claim 5 in which the adsorption vessels are arranged around an inner duct which is covered by a guide shell opposite a portion of the adsorption vessels, while the inner duct is open to the remaining adsorption vessels, an outer guide shell is located opposite the inner guide shell, and the inner duct is connected to a cooling air suction branch.

7. An arrangement according to claim 6 in which pairs of electrical contacts are embedded in the outer guide shell, said pairs being offset from one another by the separation of the adsorption vessels, each adsorption vessel being provided with a corresponding pair of electrical contacts, said corresponding pair of contacts being adaptable to be brought into contact with the contacts in the outer guide shell by rotating the adsorption vessel to the contacts in the outer guide shell, and one pair of said contacts in the outer guide shell being connected to a current source to electrically heat the adsorption vessel, and two pairs of said contacts being allocated to a measuring branch for the concentration of ammonia in the developing chamber, respectively a measuring branch for the concentration of water vapor in the developing chamber.

8. An arrangement according to claim 5 in which the stationary control disc opposite the bottom of the adsorption vessels has an electric motor flanged onto it for rotating the adsorption vessels around their common axle, said motor being electrically connected to said means which can switch the adsorption vessels cyclically.

9. An arrangement according to claim 1 including five switchable adsorption vessels, means whereby the third adsorption vessel of which can be heated to liberate water and can be connected to said line leading to the developing chamber, means whereby the fourth adsorption vessel of which can be heated to liberate the residual water and means whereby it can be connected to the exhaust air line, means whereby a fifth adsorption vessel of which can be cooled before a renewed charging with the air extracted from the developing chamber, and means whereby the five adsorption vessels, according to the concentration of ammonia measured in the exhaust air, can be switched at the same time cyclically in such a manner that when a pre-determined concentration of ammonia is exceeded the fifth adsorption vessel, which has cooled last, can be charged with the extracted air, that the fourth adsorption vessel, heated last to liberate water and connected to the exhaust air line or waste water line, can be cooled, that the third adsorption vessel, heated last to liberate water and connected to the developing chamber, continues to be heatable but can be connected to the exhaust air line, that the second adsorption vessel, connected last to the developing chamber to liberate ammonia, continues to be heatable to liberate water and remains connected to the developing chamber, and that the first adsorption vessel, charged last with the extracted air, is heated and can be connected to the developing chamber to liberate ammonia.

* * * * *